United States Patent [19]

Reik et al.

[11] Patent Number: 5,040,433

[45] Date of Patent: * Aug. 20, 1991

[54] APPARATUS FOR COUNTERACTING TORSIONAL STRESSES

[75] Inventors: Wolfgang Reik, Bühl; Hans-Dieter Elison, Offenburg, both of Fed. Rep. of Germany

[73] Assignee: Luk Lamellen und Kupplungsbau GmbH, Bühl, Fed. Rep. of Germany

[*] Notice: The portion of the term of this patent subsequent to Dec. 6, 2005 has been disclaimed.

[21] Appl. No.: 405,417

[22] Filed: Sep. 11, 1989

Related U.S. Application Data

[63] Continuation of Ser. No. 901,775, Aug. 28, 1986, abandoned.

[30] Foreign Application Priority Data

Sep. 7, 1985 [DE] Fed. Rep. of Germany ....... 3532081
Jul. 5, 1986 [DE] Fed. Rep. of Germany ....... 3622697
Aug. 25, 1986 [DE] Fed. Rep. of Germany ....... 3628770

[51] Int. Cl.[5] ........................................... F16F 15/12
[52] U.S. Cl. .................... 74/574; 192/106.2; 192/70.17; 464/68
[58] Field of Search ............... 74/574, 572; 464/66, 464/63, 68, 7, 107, 17, 24; 192/113 B, 106.2, 106.1, 30 V, 70.16, 70.17, 70.18

[56] References Cited

U.S. PATENT DOCUMENTS

| 1,543,720 | 6/1925 | Phillips et al. | 464/66 |
| 2,276,870 | 3/1942 | Prantl | 464/66 |
| 2,337,134 | 12/1943 | Thelander | 192/106.2 |
| 2,513,379 | 7/1950 | Thelander | 192/106.2 |
| 3,610,384 | 10/1971 | Borck | 192/113 B |
| 4,220,233 | 9/1980 | Ban et al. | 192/106.2 |
| 4,274,524 | 6/1981 | Nakane | 192/70.17 X |
| 4,351,167 | 9/1982 | Hanke et al. | 464/68 X |
| 4,468,207 | 8/1984 | Yoshida | 464/66 |
| 4,501,348 | 2/1985 | Lutz et al. | 464/24 |
| 4,601,676 | 7/1986 | Tojima et al. | 192/106.2 X |
| 4,611,701 | 9/1986 | Friedmann | 192/110 B |
| 4,624,351 | 11/1986 | Lutz et al. | 74/574 X |
| 4,782,718 | 11/1988 | Hartig et al. | 192/106.2 X |
| 4,788,884 | 12/1988 | Reik et al. | 192/106.2 X |

FOREIGN PATENT DOCUMENTS

| 108393 | 5/1984 | European Pat. Off. . | |
| 3440927 | 6/1985 | Fed. Rep. of Germany . | |
| 3442679 | 5/1986 | Fed. Rep. of Germany ... | 192/106.2 |
| 3515928 | 11/1986 | Fed. Rep. of Germany . | |
| 3610127 | 12/1986 | Fed. Rep. of Germany . | |
| 3528175 | 2/1987 | Fed. Rep. of Germany . | |
| 800698 | 7/1936 | France | 74/574 |
| 57-167523 | 10/1982 | Japan | 192/106.2 |
| 57-204348 | 12/1982 | Japan . | |
| 59-151624 | 8/1984 | Japan . | |
| 60-139945 | 9/1985 | Japan . | |
| 143427 | 12/1953 | Sweden | 464/66 |
| 1105292 | 3/1968 | United Kingdom | 74/574 |
| 2153970 | 8/1985 | United Kingdom | 192/106.2 |
| 2160295 | 12/1985 | United Kingdom | 192/106.2 |

Primary Examiner—Rodney M. Lindsey
Attorney, Agent, or Firm—Peter K. Kontler

[57] ABSTRACT

A vibration damping apparatus which is installed in the power train between the crankshaft of an internal combustion engine and the input shaft of a change-speed transmission in a motor vehicle has two coaxial flywheels which are rotatable relative to each other against the opposition of one or more dampers. The damper or dampers are installed in a fluid-containing chamber which is provided in part in one of the flywheels.

26 Claims, 3 Drawing Sheets

5,040,433

APPARATUS FOR COUNTERACTING TORSIONAL STRESSES

This application is a continuation of application Ser. No. 901,775, filed Aug. 28. 1986 now abandoned.

BACKGROUND OF THE INVENTION

The present invention relates to apparatus for counteracting torsional stresses, and more particularly to improvements in apparatus for damping torsional vibrations between two or more coaxial flywheels. Still more particularly, the invention relates to improvements in torsional vibration damping apparatus which can be installed between the output shafts of the engines and the input shafts of the change-speed transmissions in motor vehicles.

German Offenlegungsschrift No. 34 49 927 disclosed a torsional vibration damping apparatus which is installed between the crankshaft of an internal combustion engine and the input shaft or the change-speed transmission in an automotive vehicle. The apparatus comprises two coaxial flywheels one of which is nonrotatably secured to the crankshaft and the other of which can be coupled to the input shaft of the change-speed transmission by a friction clutch. The damper which is installed between the two flywheels comprises at least one set of energy storing springs (normally coil springs) and, if necessary, friction generating means to oppose each stage or selected stages of angular movement of the flywheels relative to each other. Each flywheel rotates with one or more disc-shaped components which have windows for the coil springs so that the coil springs are caused to store or dissipate energy in response to angular movement of one flywheel relative to the other flywheel and/or vice versa. The friction generating means engage the disc-shaped components and oppose axial movements of the flywheels relative to one another. The energy storing or friction-generating elements between the two flywheels are compelled to rub against each other and/or against the disc-shaped components of the flywheels in response to movement of one flywheel relative to the other flywheel.

OBJECTS AND SUMMARY OF THE INVENTION

An object of the invention is to provide a novel and improved torsional vibration damping apparatus wherein the wear upon the parts is low and the useful life of the parts is long.

Another object of the invention is to provide an apparatus whose operation is more reliable and more predictable than that of conventional torsional vibration damping apparatus.

A further object of the invention is to provide a relatively simple, compact and inexpensive torsional vibration damping apparatus which can be utilized with advantage in lieu of heretofore known torsional vibration damping apparatus in the power trains of motor vehicles.

Still another object of the invention is to provide novel and improved means for confining the energy storing and/or friction generating components of the above-outlined torsional vibration damping apparatus.

A further object of the invention is to provide a novel and improved method of lubricating the bearing or bearings between the flywheels of the improved torsional vibration damping apparatus.

Another object of the invention is to provide novel and improved means for lubricating the constituents of the damper or dampers between the flywheels of the above outlined torsional vibration damping apparatus.

Still another object of the invention is to provide a novel method of prolonging the useful life of energy storing and other components in the improved torsional vibration damping apparatus.

A further object of the invention is to improve the damping action of the above-outlined apparatus.

The invention is embodied in a torsional vibration damping apparatus which is particularly suited for use in motor vehicles. The apparatus comprises a plurality of coaxial flywheels including a first flywheel which is connectable to the output element of the engine in a motor vehicle and a second flywheel which is coaxial with and is rotatable relative to the first flywheel and is connectable to the input element of the change-speed transmission in a motor vehicle, particularly by way of a friction clutch. The apparatus further comprises a chamber which contains a supply of viscous fluid medium (such as oil, grease or paste) and at least one damper which operates between the flywheels, which is disposed in the chamber, and which comprises at least one energy storing element, for example, at least one set of coil springs. The chamber is preferably an annular chamber which surrounds the common axis of the first and second flywheels. At least the major part of the chamber can be defined by one of the first and second flywheels, for example, by the first flywheel.

The chamber includes an outer wall which is remote from the common axis of the first and second flywheels, and two sidewalls extending from the outer wall toward the common axis and flanking the one damper. One of the sidewalls is disposed between the first and second flywheels and has a radially innermost portion. Such apparatus further comprises at least one sealing element which is interposed between the radially innermost portion of the one sidewall and one of the first and second flywheels. The outer wall of the chamber can constitute an axial annular extension of the one flywheel. The one sidewall can be affixed to and then extends from the extension toward the common axis of the first and second flywheels. Fastener means can be provided for separably or permanently securing the one sidewall to an end face of the extension of the one flywheel. A sealing element can be mounted between the end face of the extension and the one sidewall. The one sidewall can be substantially rigid, and one or more sealing means can be interposed between the radially innermost portion of such rigid sidewall and the one and/or the other flywheel. The sealing means can include an axially stressed diaphragm spring. The sealing means can further comprise a sealing element (for example, an O-ring) which engages the diaphragm spring and the one flywheel. In addition to or instead of such sealing element, the sealing means can comprise a sealing element which engages the one sidewall and the diaphragm spring. Alternatively, the one sidewall can be made of a resilient material and can be mounted in axially stressed condition. The radially innermost portion of such resilient sidewall then bears against one of the flywheels. A sealing element can be interposed between the resilient sidewall and the one and/or the other flywheel.

The arrangement may be such that a sealing element of friction material can be interposed between one sidewall of the chamber and one of the first and second flywheels. Alternatively, or in addition to such sealing element of friction material, the apparatus can comprise one or more sealing elements of slip enhancing material which is or which are interposed between one sidewall of the chamber and at least one of the flywheels.

One of the sidewalls can constitute a substantially radially disposed flange which is an integral part of one of the flywheels, for example, of the first flywheel. Of the several sealing elements which are employed to prevent uncontrolled escape of fluid medium from the chamber, at least one sealing element or at least one group of sealing elements preferably operates directly between the first and second flywheels.

One of the first and second flywheels is preferably provided with an axial protuberance and the other of the first and second flywheels is then formed with a recess for the protuberance. Such apparatus preferably further comprises bearing means provided in the recess for the protuberance of the one flywheel. The bearing is preferably adjacent a portion of the chamber, and the apparatus can further comprise sealing means for preventing the escape of flowable medium from the chamber by way of the bearing means.

The energy storing element can comprise at least one coil spring (for example, one or more annularly arranged sets of discrete coil springs) and the damper of such apparatus preferably further comprises friction generating means.

The fluid medium can fill a portion of or the entire chamber. In accordance with one presently preferred embodiment of the invention, the fluid medium fills a portion at least of the chamber so that the fluid medium contacts the energy storing element under the action of centrifugal force, at least while the flywheels rotate.

The damper can comprise at least one fluid-operated damping unit, for example, a hydrodynamic damping unit, a hydrostatic damping unit and/or a gravity-operated damping unit.

As mentioned above, the fluid medium can be of greasy or pasty consistency. However, it is equally possible to employ fluid media of lower viscosity.

The second flywheel and the chamber can define a substantially ring-shaped clearance. Such chamber has one of its sidewalls adjacent the second flywheel and the second flywheel is provided with at least one passage for conveying a coolant, such as atmospheric air, against the one sidewall.

The novel features which are considered as characteristic of the invention are set forth in particular in the appended claims. The improved apparatus itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 1:
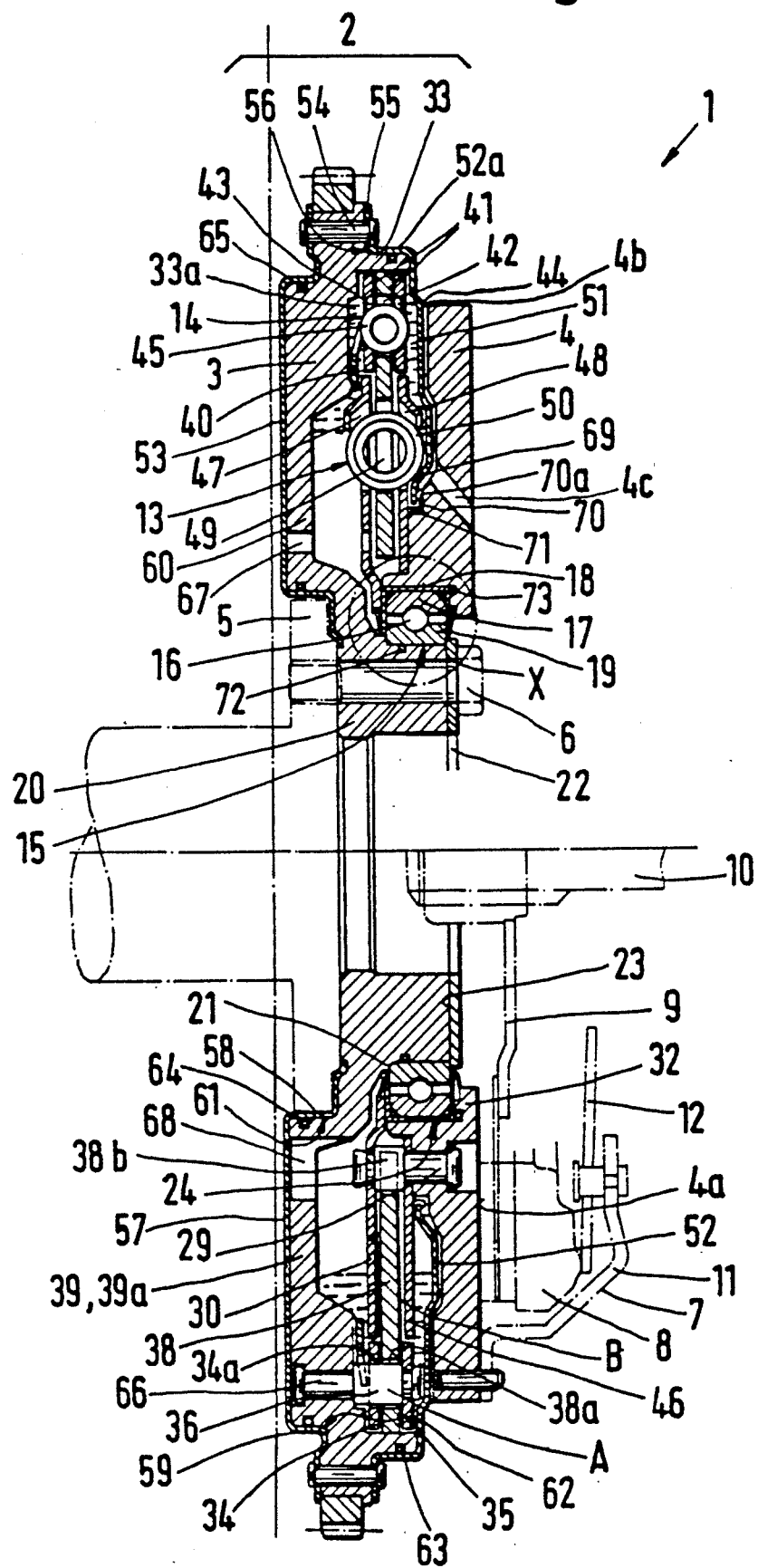
FIG. 1 is an axial sectional view of an apparatus which embodies one form of the invention, certain parts being shown by phantom lines.
Figure 2:
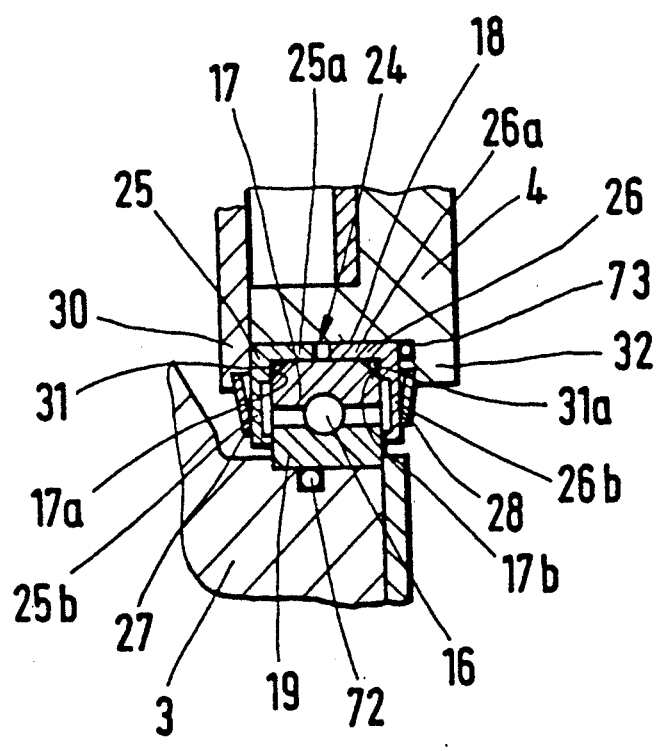
FIG. 2 is an enlarged view of the detail within the phantom-line circle X in FIG. 1.

The torsion damping apparatus 1 which is shown in FIGS. 1 and 2 comprises a composite flywheel 2 including a first flywheel 3 and a second flywheel 4. The flywheel 3 is rigidly connected to the crankshaft 5 (indicated by phantom lines) of an internal combustion engine by a set of screws 6, bolts or analogous fasteners (also shown by phantom lines) radially inwardly of the second flywheel 4 which is connectable with the input shaft 10 (indicated by phantom lines) of a change-speed transmission in a motor vehicle by a friction clutch 7 (indicated by phantom lines). The manner in which the friction clutch 7 is connected with the flywheel 4 is known and need not be described here. The friction clutch 7 comprises a cover 11 which is non-rotatably secured to the flywheel 4 and confines an axially movable pressure plate 8 which is biased toward the friction surface 4a of the flywheel 4 by a diaphragm spring 12. When the diaphragm spring 12 is free to bias the pressure plate 8 in a direction to the left, as seen in FIG. 1, the pressure plate 8 cooperates with the flywheel 4 to rotate a clutch plate 9 which is secured to the input shaft 10. At such time, the crankshaft 5 of the internal combustion engine can drive the input shaft 10 by way of the composite flywheel 2 and the friction clutch 7.

The damper means between the flywheels 3 and 4 comprises a first damper 13 which is in series with a second damper 14. The dampers 13 and 14 oppose angular displacements of the flywheels 3 and 4 relative to each other.

The apparatus 1 further comprises a bearing means 15 between the flywheels 3 and 4. The bearing means 15 comprises an antifriction bearing 16 with a single row of spherical rolling elements. The outer race 17 of the bearing 16 is spacedly surrounded by a cylindrical surface bounding a coaxial recess 18 of the flywheel 4, and the inner race 19 of the bearing 16 is mounted on a coaxial cylindrical protuberance 20 of the flywheel 3. The protuberance 20 extends into the recess 18 of the flywheel 4. The inner race 19 of the bearing 16 is a press fit on the protuberance 20 and abuts a shoulder 21 which is provided on the protuberance. The race 19 is held against axial movement on the protuberance 20 by a disc-shaped retainer 22 which abuts the end face 23 of the protuberance and is held on the protuberance by the aforementioned screws 6.

The apparatus 1 further comprises a thermal barrier or insulator 24 which is interposed between the second flywheel 4 and the outer race 17 of the antifriction bearing 16. The purpose of the insulator 24 is to interrupt or reduce the propagation of heat from the friction surface 4a of the flywheel 4 to the component parts of the bearing 16.

As can be seen in FIG. 2, the thermal insulator 24 comprises two coaxial rings 25 and 26 each of which has a substantially L-shaped cross-sectional outline. The axially extending portions 25a and 26a of the rings 25, 26 are disposed between the surface bounding the recess 18 of the flywheel 4 and the peripheral surface of the outer race 17. The rings 25, 26 further comprise radially inwardly extending portions 25b, 26b which are adjacent the respective end faces of the outer race 17 and extend inwardly so as to contact the respective end faces of the inner race 19. In this manner, the rings 25, 26 constitute a composite seal which prevents uncontrolled escape of lubricant from the space between the races 17 and 19. The arrangement is preferably such that the radially innermost parts of axially extending portions 25b, 26b of the rings 25, 26 are biased axially so that they bear against the respective end faces of the inner race 19 of the bearing 16. To this end, the thermal insulator 24 preferably comprises energy storing elements in the form of diaphragm springs 27 and 28 which respectively act upon the radially extending portions 25b and 26b in directions to urge the radially innermost parts of the portions 25b, 26b against the adjacent end faces of the inner race 19. The diaphragm spring 27 has a radially outermost portion which reacts against a shoulder on a disc 30 which is secured to the flywheel 4 by fasteners 29 in the form of rivets (see FIG. 1), and the radially innermost portion of the diaphragm spring 27 bears against the radially innermost part of the portion 25b. The diaphragm spring 28 has a radially outermost portion which reacts against a shoulder 32 of the flywheel 4 and a radially innermost portion which applies axial pressure against the adjacent radially innermost part of the radially inwardly extending portion 26b of the ring 26 so that the portion 26b is in proper sealing engagement with the adjacent end face of the inner race 19. The arrangement is preferably such that the bias of one of the diaphragm springs (preferably of the diaphragm spring 28) is greater than the bias of the other diaphragm spring (27). This ensures that, when the clutch 7 is engaged (i.e., when the radially inwardly extending prongs of the diaphragm spring 12 are not acted upon by a bearing or the like in a sense to permit the pressure plate 8 to move axially and away from the flywheel 4), the diaphragm spring 28 urges the flywheel 4 and the outer race 17 in a direction to the right and away from the flywheel 3, as seen in FIG. 1. The extent of rightward movement of the flywheel 4 relative to the flywheel 3 corresponds to the extent of play between the races 17 and 19, as seen in the axial direction of the bearing 16.

When the friction clutch 7 is in the process of being disengaged, the stronger diaphragm spring 28 ensures that the flywheel 4 and the outer race 17 move axially toward the flywheel 3 through a distance which is determined by the just discussed axial play between the races 17 and 19. Such repeated axial shifting of the flywheel 4 and outer race 17 in response to engagement or disengagement of the friction clutch 7 ensures that the rolling elements of the bearing 16 turn relative to the adjacent races 17 and 19. Rolling is desirable and advantageous because it prevents highly localized wear upon the component parts of the bearing 16. Such movements of the rolling elements of the bearing 16 are greatly enhanced if one of the radially inwardly extending portions 25b, 26b (for example, the portion 26b) acts upon the inner race 19 with a force which is greater than that of the other radially inwardly extending portion. When the flywheels 3, 4 turn relative to each other, the radially innermost parts of the portions 25b, 26b rub against the adjacent end faces of the inner race 19 and generate friction which damps the angular movements of the flywheel 4 relative to the flywheel 3 and/or vice versa. The damping action is effective during each and every stage of angular movement of the flywheels 3, 4 relative to each other.

The radially outermost portion of the outer race 17 is chamfered at 17a and 17b to provide ring-shaped compartments with the adjacent rings 25, 26. The compartments receive sealing elements in the form of O-rings 31, 31a. The purpose of the O-rings 31, 31a is to prevent escape of the lubricant (such as a grease) from the space between the races 17 and 19 by migrating along the end faces of the outer race 17 and thereupon axially toward the clearance between the rings 25, 26 at the periphery of the race 17.

The outer race 17 is held against axial movement relative to the second flywheel 4 by the rings 25, 26 of the thermal insulator 24. As mentioned above, the ring 25 abuts the disc 30 which is riveted to the flywheel 4, and the ring 26 abuts the integral shoulder 32 of the flywheel 4.

FIG. 1 shows that the flywheel 3 is provided with an axial extension 33 which constitutes the outer wall of an annular chamber 33a for the dampers 13 and 14. The input element of the second damper 14 comprises two axially spaced-apart discs 34, 35 which are non-rotatably secured to the flywheel 3. The disc 35 is secured to the flywheel 3 by distancing elements in the form of rivets 36. The disc 34 has openings 34a through which portions of the distancing elements 36 extend to ensure that the discs 34 and 35 cannot rotate relative to each other. However, the discs 34 and 35 are movable relative to each other in the axial direction of the composite flywheel 2. The output element of the second damper 14 is a flange 38 which is disposed between the discs 34 and 35. The disc 34 is biased against the flange 38, so as to bias the flange 38 against the disc 35, by an energy storing device in the form of a diaphragm spring 40 which reacts against a radially extending flange 39 of the flywheel 3 and bears against the adjacent side of the disc 34 so as to urge the latter toward the disc 35.

The damper 14 further comprises friction linings 41 which are interposed between the flange 38 and the discs 34 and 35. The flange 38 and the discs 34, 35 are respectively provided with registering windows 42, 43, 44 for energy storing elements in the form of coil springs 45. Such coil springs oppose angular movements of the flange 38 and the discs 34, 35 relative to each other.

The flange 38 constitutes the output element of the second damper 14 as well as the input element of the first damper 13. The output element of the damper 13 comprises two discs including the aforementioned disc 30 and a further disc 46. The discs 30, 46 are disposed at opposite sides of the flange 38 and are non-rotatably secured to each other at a predetermined axial distance by the rivets 29 which are anchored in the flywheel 4.

The discs 30, 46 and the flange 38 have registering windows 47, 48 and 49 for energy storing elements in the form of coil springs 50. The purpose of the coil springs 50 is to oppose angular movements of the flange 38 and discs 30, 46 relative to each other.

The radially outermost portion of the flange 38 has circumferentially extending slots or recesses 38a for portions of the respective rivets 36. The extent to which the flange 38 and the rivets 36 can move relative to each other in the circumferential direction of the composite flywheel 2 determines the range of effectiveness of the damper 14. The range of the damper 13 is determined by the circumferential length of the recesses 38b which are provided in the flange 38 for the rivets 29.

The chamber 33a is at least substantially sealed from the surrounding atmosphere and contains a supply of a fluid lubricating medium. For example, the fluid medium can be a silicone oil. The chamber 33a can be partially or completely filled. For example, when the apparatus 1 rotates, the supply of fluid medium can fill the radially outermost portion of the chamber 33a to such an extent that the windings of the coil springs 45 are at least partially contacted by the fluid medium. The coil springs 45 can be partially or completely immersed in the fluid medium. However, the arrangement can also be such that the entire coil springs 45, the entire discs 34 and 35 or at least certain portions of the inner coil springs 50 are contacted by the fluid medium when the apparatus 1 rotates, i.e., when the engine drives the crankshaft 5.

The major part at least of the interior of the chamber 33a is defined by an annular space 51 which is provided in the first flywheel 3 and is bounded at its periphery by the extension 33 of the flywheel 3. The chamber 33a further includes two sidewalls 39a and 52 which extend radially inwardly from the extension 33 at opposite sides of the two sets of coil springs 45 and 50. The sidewall 39a includes the radial flange 39 of the flywheel 3 and a sealing lid 53 which is affixed to the outer side of the flange 39. The sidewall 52 includes or is a cover which is disposed between the flywheels 3 and 4 and is secured to the extension 33 of the flywheel 3. To this end, the sidewall 52 includes an axially extending portion 52a which overlies the extension 33 of the flywheel 3, and a radially outwardly extending brim-like portion 55 which extends from the axially extending portion 52a and is affixed to the flywheel 3 by a set of rivets 54. The brim-like portion 55 of the sidewall 52 abuts a radially extending surface 56 of the flywheel 3.

The rivets 54 serve the additional purpose of securing the sealing lid 53 to the radially outermost portion of the flywheel 3. The lid 53 includes a radially extending major portion or bottom 57 which is adjacent the outer side of the flange 39 of the flywheel 3, a sleeve-like tubular portion 58 which is adjacent the radially innermost portion of the bottom 57, and a sleeve-like tubular portion 59 which is adjacent the radially outermost portion of the bottom 57.

The apparatus 1 further comprises several sealing elements which prevent uncontrolled leakage of fluid medium from the chamber 33a. Some of the sealing elements are installed between the extension 33 of the flywheel 3 and the axially extending portion 52a of the sidewall 52 and other sealing elements are disposed between axially extending tubular portions 58, 59 of the lid 53 and the flywheel 3. The flange 39 of the flywheel 3 includes a radially extending washer-like major portion 60 which is surrounded by the portions 57, 58 and 59 of the lid 53 at the exposed side of the flywheel 3. The sealing element between the axially extending portion 52a of the sidewall 52 and the extension 33 is denoted by the reference character 63, and the sealing elements between the tubular portions 58, 59 of the lid 53 and the washer-like portion 60 of the flange 39 are denoted by the characters 64 and 65. Each of the sealing elements 63-65 can constitute an elastic O-ring. Each O-ring is received in a suitably configurated groove which is machined into the flywheel 3.

The purpose of the lid 53 is to seal the openings 66, 67 and 68 which are provided in the flywheel 3 for the purpose of facilitating assembly of the apparatus 1. The number of such openings can be less than three or it can exceed three.

A sealing ring 70 of slip enhancing material is disposed between the radially innermost portion 69 of the sidewall 52 and the adjacent portion of the flywheel 4. The sealing ring 70 has a substantially L-shaped cross-sectional outline and engages in a shoulder 71 of the flywheel 4 radially inwardly of the coil springs 50. The sidewall 52 is preferably made of an elastic or resilient material and is installed in prestressed condition so that it bears against the radially outwardly extending portion 70a of the sealing ring 70. This ensures adequate sealing of the chamber 33a in the region where the radially innermost portion of the sidewall 52 is adjacent the flywheel 4. Such sealing action is satisfactory even after the sealing ring 70 and/or the cover 52 undergoes a certain amount of wear because the sidewall 52 is installed in prestressed condition.

The arrangement for preventing uncontrolled escape of fluid medium from the chamber 33a further includes sealing means between the inner race 19 of the antifriction bearing 16 and the protuberance 20 of the flywheel 3. Such sealing means comprises a sealing ring 72 in the form of an O-ring which is recessed into the periphery of the protuberance 20 (see particularly FIG. 2) and contacts the internal surface of the inner race 19. A further sealing element 73 in the form of an O-ring 73 is recessed into a groove in the shoulder 32 of the second flywheel 4 adjacent the junction of the portions 26a and 26b of the ring 26 forming part of the thermal insulator 24. Reference may be had to FIG. 2. The illustrated O-rings 72 and 73 can be replaced with other types of sealing elements without departing from the spirit of the invention.

The chamber 33a is provided primarily in the first flywheel 3 and confines the dampers 13, 14 which are at least partially immersed in the hydraulic fluid medium. The chamber 33a separates the dampers 13 and 14 from the second flywheel 4 which carries the friction clutch 7 to thus ensure that friction heat which is generated by the clutch 7 is not transmitted, or is not fully transmitted, to the damper or dampers and/or to the fluid medium in the chamber 33a. It is preferred to provide an annular clearance or gap 4b between the outer side of the sidewall 52 and the adjacent inner side of the second flywheel 4 and to leave the radially outermost portion of the clearance 4b open for penetration or evacuation of a coolant, preferably atmospheric air. Such coolant can enter the clearance 4b by way of one or more aerating passages 70a which are provided in the second flywheel 4 at the level of the radially innermost portion of the sidewall 52. Currents of air which enter the clearance 4b by way of the passage or passages 4c flow radially outwardly to cool the flywheel 4 as well as the sidewall 52 and to leave the clearance 4b at its radially outermost end.

The radially extending portions 25b and 26b of the rings 25, 26 which form part of the thermal insulator 24 constitute additional sealing elements which prevent escape of fluid medium from the chamber 33a by way of the ring-shaped space for the rolling elements of the antifriction bearing 16 between the inner and outer races 19, 17.

The characteristic curves of coil springs 50 forming part of the damper 13 are flatter than the characteristic curves of coil springs 45 of the damper 14. This ensures that, when the flywheel 3 is caused to change its angular position relative to the flywheel 4 by leaving a neutral or starting position, the coil springs 50 undergo deformation ahead of the coil springs 45. Furthermore, the friction generating means including the radially extending portions 25b, 26b of the rings 25, 26 in the thermal insulator 24 are also active before the coil springs 45 undergo deformation. Deformation of the coil springs 50 can take place simultaneously with angular displacement of the sealing ring 70 and sidewall 52 relative to each other. Consequently, the discs 34, 35, the adjacent friction linings 44 and the flange 38 (which is biased by the diaphragm spring 40) turn relative to the discs 30, 46 which are non-rotatably connected with the flywheel 4. When the moment of the outer damper 14 is exceeded, the rivet or rivets 36 and the discs 34, 35 start to turn relative to the flange 38 so that the coil springs 45 also undergo deformation (they store additional energy) and the moment of friction which is generated by the linings 41 in cooperation with the diaphragm spring 40 becomes effective. When the extent of angular movement of the flywheel 3 relative to the flywheel 4 reaches that maximum value which is determined by the rivet or rivets 29 and the circumferentially extending slot or slots 38b, the damper 13 is blocked and only the damper 14 continues to be effective. The damper 14 remains effective until the rivets 36 reach the one or the other end of the respective arcuate slots or recesses 38a.

As mentioned above, the chamber 33a need not be filled with a fluid medium, such as oil, grease or another viscous substance. As also mentioned above, the quantity of fluid medium in the chamber 33a can be selected in such a way that only the radially outermost portions of, or the entire, outer coil springs 45 are immersed in the fluid medium when the apparatus 1 rotates; that the supply of fluid medium suffices to be in contact with portions of, or the entire, coil springs 50 when the flywheels 3, 4 rotate relative to or together with each other; or that the entire coil springs 50 are immersed in the fluid medium as soon as or at least when the apparatus 1 is set in rotary motion. If the extent of filling of the chamber 33a with a fluid medium is such that the flange 38 and at least the entire radially extending portions of the discs 34, 35 are contacted by the fluid medium, the apparatus defines a hydrostatic damper A which is active at least in the region of the parts 34, 35, 38 because the fluid medium can be pumped through the slot 38a in the flange 38 so that it flows back and forth between the space between the disc 34 and the flange 38 and the space between the flange 38 and the disc 35.

If the fluid medium reaches that portion of the chamber 33a where the discs 30, 46 overlap the corresponding portion of the flange 38 (as seen in a direction toward the common axis of the flywheels 3 and 4), the apparatus 1 defines a viscous damper B which operates with shearing effect between the flywheels 3 and 4.

It is often preferred to select the quantity of fluid medium which is confined in the chamber 33a in such a way that, when the engine which drives the crankshaft 5 is idle, the upper level of the supply of fluid medium does not reach the sealing ring 70. This reduces the likelihood of leakage of fluid medium from the chamber 33a not only when the viscosity of the fluid medium is relatively low but also when the fluid medium is of a pronounced pasty or greasy consistency. A pasty or greasy fluid medium is likely to reduce its viscosity in response to heating when the engine is on to drive the input shaft 10 of the change-speed transmission. The viscosity of such fluid medium increases as a result of cooling when the engine is idle but the fluid medium is properly distributed again under the action of centrifugal force as soon as the crankshaft 5 is set in rotary motion. In other words, the hydraulic damping and lubricating action of the confined fluid medium is felt practically instantaneously in response to renewed starting of the engine.

It is clear that the damper means of FIG. 1 can be modified in a number of ways without departing from the spirit and scope of the invention. The damper means can operate hydraulically and/or mechanically, i.e., with or without relying on a supply of viscous fluid medium.

The fluid medium can be a mixture of two or more viscous fluids. An advantage of oils is that their viscosity changes relatively little in response to heating or cooling. However, it is equally possible to employ any one of a variety of fatty or pasty fluid media, particularly those which are capable of retaining their viscosity within the range of temperatures which develop when the improved apparatus is in actual use. It is often sufficient if the viscosity of the confined fluid medium does not appreciably deviate from a standard or optimum value. An advantage of a fluid medium having a relatively high viscosity is that it need not necessarily accumulate in the lower portion of the apparatus 1 when the crankshaft 5 is idle. This could cause the fluid medium in the lower part of the chamber 33a to constitute an eccentric weight which would cause the rotary parts to run out of true. The likelihood of accumulation of heated fluid medium in the lower portion of the chamber 33a is particularly pronounced if the chamber 33a is only partially filled. Quite surprisingly, the improved apparatus operates properly if the fluid medium is a low-viscosity liquid, such as an oil. Low-viscosity fluids create no problems as concerns the balancing of the apparatus during and immediately after restarting of the engine.

An important advantage of the improved apparatus is that all or nearly all component parts of the dampers 13, 14 are properly lubricated when the apparatus is in use. This considerably reduces the wear upon such parts, particularly upon the coil springs 45, 50, upon the surfaces surrounding the windows for the coil springs as well as upon other parts which would rub directly against each other in the absence of a continuous supply of a lubricating medium. Moreover, proper lubrication enhances the reliability of the apparatus. It has been found that the useful life of the apparatus which employs the chamber 33a and a supply of lubricating medium therein is considerably longer than the useful life of conventional torsion damping apparatus. Proper lubricating further reduces friction between the neighboring windings or convolutions of the coil springs 45 and/or 50. Satisfactory lubrication and hence a longer useful life is particularly important when the apparatus is used to transmit torque from a rapidly rotating engine to a change-speed transmission or another driven component in a motor vehicle or the like. Proper lubrication in such apparatus is desirable because the rapidly rotating engine causes the coil springs to act upon the adjacent surfaces in the windows of the respective plate-like elements under the action of centrifugal force. In conventional apparatus which are used to transmit torque from rapidly rotating engines, the surfaces surrounding the windows cause pronounced wear upon the adjacent portions or convolutions of the coil springs. The lubricant in the chamber 33a effectively prevents or greatly reduces direct metal-to-metal contact between the energy storing elements of the dampers in the chamber 33a and the surfaces bounding the windows for such energy storing elements.

The lubricant in the chamber 33a also eliminates or greatly reduces wear upon the energy storing elements which act in the axial direction of the apparatus 1 as well as upon those parts which are in contact with these energy storing elements.

The provision of one or more dampers which act as hydrodynamic or hydrostatic dampers, or dampers which operate under the action of gravity, also contributes to longer useful life of the improved apparatus. The principle of operation of a hydrodynamic damper can be the same as that underlying the operation of a fluid converter or a Föttinger coupling, and a hydrostatic damper can operate by conveying or pumping the fluid medium through compartments, channels or like passages. This additional damping action can be chosen in advance by appropriate selection of the viscosity of fluid medium in the chamber. Furthermore, such damping action can be regulated by properly selecting the cross-sectional areas of the paths for the flow of fluid medium in a hydrodynamic and/or hydrostatic damper.

The chamber 33a may but need not extend circumferentially all the way around the common axis of the flywheels 3 and 4. It is presently preferred to provide the apparatus with a circumferentially complete (annular) chamber. Savings in space are achieved if the chamber 33a is provided primarily or exclusively in one of the two or more flywheels which constitute the composite flywheel of the improved apparatus.

An important advantage of providing the chamber 33a on or in one of the flywheels is that such chamber can be more readily sealed against undesirable or excessive escape of the confined fluid medium. The provision of the major part of or of the entire chamber 33a in or on the first flywheel 3 is desirable and advantageous because the chamber and the fluid medium therein act as thermal insulators against transmission of excessive quantities of heat from the flywheel 4 to the flywheel 3 when the apparatus 1 is in use. Some heating of the flywheel 4 cannot be avoided because this flywheel carries and cooperates with the friction clutch 7 which transmits torque to the input element 10 of the change-speed transmission.

The relatively thin sidewall 52 between the flywheels 3 and 4 contributes to compactness of the chamber 33a as well as to compactness of the entire apparatus. The radially innermost and outermost portions of the sidewall 52 can be readily sealed by the sealing rings 63 and 70 so as to prevent escape of the confined fluid medium.

The sidewall 52 can exhibit a certain amount of resiliency so that it can be installed in prestressed condition and its radially innermost portion then bears against the radially extending portion 70a of the sealing ring 70 which is adjacent the shoulder 71 of the flywheel 4. This obviates the need for a separate energy storing device as a means for biasing the radially innermost portion of the 52 against the sealing ring 70. However, it is equally within the purview of the invention to provide a relatively rigid or non-elastic sidewall 52 and to employ one or more diaphragm springs or other resilient elements reacting against the disc 46 and urging the radially innermost portion of the sidewall 52 against the radially extending portion 70a of the sealing ring 70. If a diaphragm spring is used, the apparatus can comprise at least one additional sealing element (for example, an O-ring) between the diaphragm spring and the disc 46 and/or at least one sealing element between the diaphragm spring and the radially innermost portion of the sidewall 52.

The provision of the aforediscussed radially extending circumferentially complete clearance 4b between the cover 52 and the flywheel 4 and of one or more passages 4c in the flywheel 4 greatly reduces the likelihood of excessive heating of the supply of fluid medium in the chamber 33a. This, in turn, contributes to longer useful life and greater reliability of the dampers 13 and 14. The clearance 4b preferably extends well toward the common axis of the flywheels 3 and 4 so as to ensure that the entire or nearly entire right-hand side of the chamber 33a is properly cooled when the composite flywheel 2 rotates and the flow of a stream of coolant is induced through the passage or passages 4c, in the clearance 4b between the sidewall 52 and the inner side of the flywheel 4, and out from the radially outermost portion of the clearance 4b. A cooling action in the region of the sealing ring 70 is particularly desirable and advantageous. The inclination of the passage or passages 4c can be readily selected in such a way that each such passage induces a pronounced flow of coolant toward the respective portion of the clearance 4b.

Those sealing elements which are caused to rub against each other and/or against other parts of the apparatus can be made of a suitable friction material or slip enhancing material.

While it is also possible to employ a chamber 33a which includes two sidewalls each of which corresponds to or resembles the cover 52, the utilization of a chamber wherein one sidewall is constituted directly by one of the flywheels 3, 4 is preferred because this simplifies the construction of the entire apparatus an contributes to compactness of the dampers and of the means for confining the dampers. Moreover, the confined fluid medium can directly cool the flywheel which is provided with the space 51.

The sealing rings 72, 73 and the rings 25, 26 of the thermal insulator 24 can be said to constitute a composite sealing means which acts directly between the flywheels 3 and 4. This can be readily seen in FIG. 2. The O-ring 72 acts between the flywheel 3 and the inner race 19 of the bearing 16 which, together with the radially extending portions 25b, 26b of the rings 25, 26 and with the O-rings 73, constitutes a seal between the O-ring 72 and the second flywheel 4. The placing of the bearing 16 and of the O-ring 72 around the protuberance 20 of the first flywheel 3 contributes to simplicity and compactness of the apparatus.

Satisfactory results have been achieved when the quantity of fluid medium in the chamber 33a was selected in such a way that the fluid medium filled between one-fourth and three-fourths of the chamber (as measured in the radial direction of the flywheel 2) when the apparatus 1 was in actual use.

Figure 3:
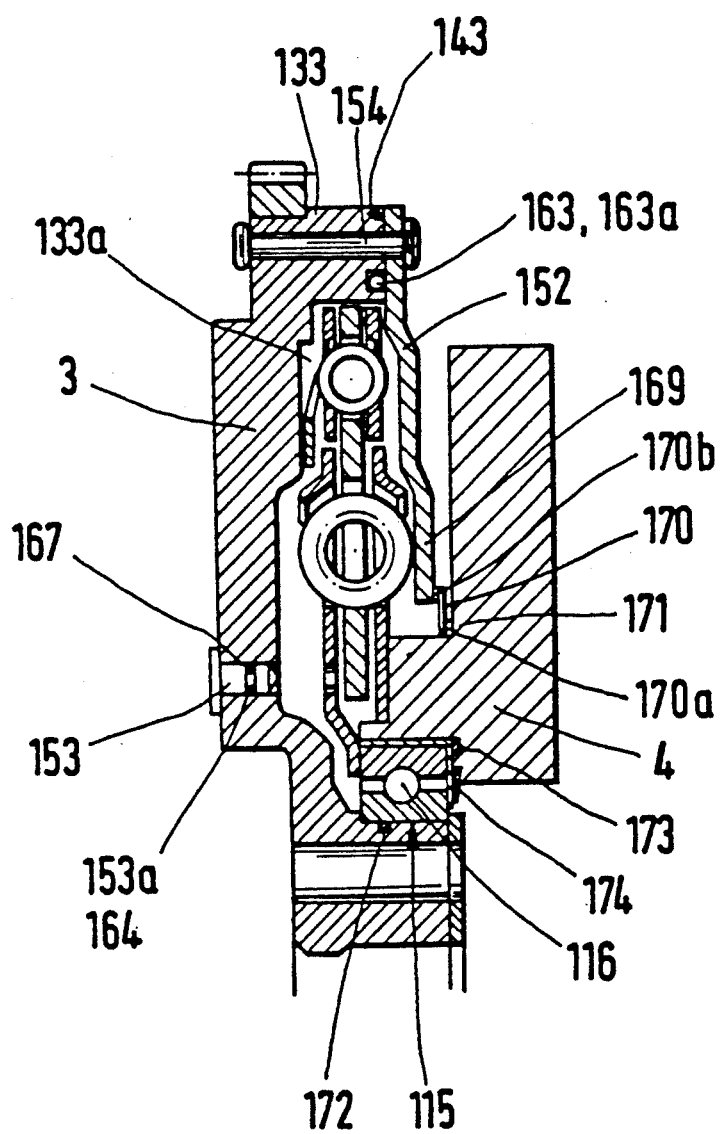
FIG. 3 is a fragmentary axial sectional view of a modified apparatus.

FIG. 3 illustrates a portion of a modified apparatus wherein the lid 53 of the chamber 33a of FIGS. 1 and 2 is omitted. The flywheel 3 of FIG. 3 has one or more openings 167 which are needed to facilitate assembly of the apparatus. Each such opening contains a sealing plug 153 having a head at the outer side of the flywheel 3 35 and a shank provided with a circumferential groove 153a for a sealing ring 164 which is deformed in response to insertion of the shank into the opening 167. The chamber 133a of FIG. 3 comprises an axial extension 133 at the radially outermost part of the flywheel 3, the radially extending flange of the flywheel 3 (such flange constitutes one sidewall of the chamber 133a) and a second sidewall or cover 152 which is rigid or substantially rigid and the radially outermost portion of which is secured to the extension 133 by a set of rivets 154 or similar fasteners so that the radially outermost portion of the cover 152 abuts the end face 143 of the extension 133. The end face 143 is formed with at least one groove 163a for a ring-shaped seal, for example an O-ring 163 which is deformed when the rivets 154 hold the sidewall 152 in the illustrated position.

The sidewall 152 can be made of a piece of rigid sheet metal and its radially innermost portion 169 cooperates with sealing means to ensure that the fluid medium cannot escape from the chamber 133a along the inner side of the flywheel 4. The sealing means at the radially innermost portion 169 of the cover 152 comprises a prestressed diaphragm spring 170 which has or carries a first sealing lip 170b bearing against the adjacent side of the portion 169 and a second sealing lip 170a which abuts a shoulder 171 forming part of the internal surface of the flywheel 4. The sealing lips 170a, 170b of the diaphragm spring 170 can be made of a friction generating material or of a slip enhancing material.

The sealing elements 172 and 173 (for example, O-rings) perform the same function as the sealing elements 72 and 73 of FIG. 2. The bearing assembly 115 between the protuberance of the flywheel 3 and the surface bounding the recess of the flywheel 4 comprises an antifriction bearing 116 with a single row of spherical rolling elements. The reference character 174 denotes a diaphragm spring which acts as a sealing element between the radially innermost portion of the flywheel 4 and the inner race of the bearing 116 so as to prevent escape of lubricant from the space between the inner and outer races of the bearing. The left-hand side of the bearing 116 is open so that the supply of lubricant in the chamber 133a can serve as a means for lubricating the rolling elements of the bearing 116. This simplifies the construction of the apparatus.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. Apparatus for reducing fluctuations of torque which is transmitted between an output element of an engine and an input element of a transmission in a motor vehicle, comprising a first flywheel connectable with the output element of the engine; a second flywheel coaxial with and rotatable relative to said first flywheel; an at least substantially sealed chamber including a first sidewall extending substantially radially and forming part of said first flywheel and a second sidewall disposed between said first sidewall and said second flywheel, carried by said first flywheel and arranged to seal said chamber; a supply of viscous fluid medium at least partially filling said chamber; a friction clutch between said second flywheel and the input element of the transmission; single antifriction bearing means constituting the only means for centering and mounting said flywheels for rotation about a common axis; and damper means provided in said chamber to oppose rotation of said flywheels relative to each other and including at least one energy storing element which acts in the circumferential direction of said first and second flywheels and elastically couples said first and second flywheels to each other.

2. The apparatus of claim 1, wherein said first flywheel includes an axial extension having an end face and a radially outer portion of said second sidewall abuts said end face and is affixed to said extension, and further comprising sealing means between said extension and said second sidewall.

3. The apparatus of claim 1, further comprising means for sealing said chamber including an axially stressed diaphragm spring adjacent a radially inner portion of said second sidewall.

4. The apparatus of claim 3, wherein said sealing means further includes a sealing element between said diaphragm spring and one of said flywheels.

5. The apparatus of claim 3, wherein said second sidewall includes a rigid radially inner portion and said sealing means further includes a sealing element between said diaphragm spring and the radially inner portion of said second sidewall.

6. The apparatus of claim 1, wherein said second sidewall is resilient and includes a radially inner portion which is axially stressed toward one of said flywheels.

7. The apparatus of claim 6, further comprising sealing means between said one flywheel and the radially inner portion of said second sidewall.

8. The apparatus of claim 1, further comprising means for sealing said chamber including at least one first sealing element adjacent a radially inner portion of said second sidewall and at least one additional sealing element, said at least one additional sealing element being disposed between said flywheels.

9. The apparatus of claim 8, wherein one of said flywheels includes a centrally located axial protuberance and the other of said flywheels has a recess for said protuberance, said bearing means and said at least one additional sealing element being disposed in said recess.

10. The apparatus of claim 1, wherein said damper means further comprises friction generating means.

11. The apparatus of claim 1, wherein the fluid medium fills said chamber to an extend such that the fluid medium contacts said at least one energy storing element under the action of centrifugal force at least while said flywheels rotate.

12. The apparatus of claim 1, wherein said damper means comprises at least one hydrodynamic damping unit.

13. The apparatus of claim 1, wherein said damper means comprises at least one hydrostatic damping unit.

14. The apparatus of claim 1, wherein said damper means comprises at least one damping unit which operates with shearing effect.

15. The apparatus of claim 1, wherein said damper means comprises a displacement type hydraulic damping unit, said damping unit including a flange-like member for transmission of torque to said second flywheel, two substantially disc-shaped members flanking said flange-like member and mounted on one of said flywheels, and means for securing said disc-shaped members to each other, said flange-like member having at least one circumferentially extending recess for said securing means and said members cooperating with said securing means to displace the fluid medium in response to rotation of said flywheels relative to each other.

16. The apparatus of claim 15, wherein said securing means is received in said at least one recess with limited freedom is movement in the circumferential direction of said flywheels to determine the extend of angular movability of said flywheels relative to each other.

17. The apparatus of claim 1, further comprising means for sealing said chamber from the atmosphere including at least one first sealing element between said second sidewall and said second flywheel, a thermal barrier between said second flywheel and said bearing means, and bearing means including a race and said sealing means further comprising at least one additional sealing element adjacent said race.

18. The apparatus of claim 1, wherein said second sidewall and said second flywheel define and annular clearance, said second flywheel having at least one passage to convey a coolant into said clearance.

19. The apparatus of claim 18, wherein said at least one passage is oriented to direct coolant against said second sidewall.

20. The apparatus of claim 1, wherein said bearing means has a side facing away from said chamber and includes an inner race and an outer race, and further comprising a sealing element which is disposed at said side of said bearing means, said sealing element being non-rotatably connected with one of said races and bearing against the other of said races.

21. The apparatus of claim 20, wherein said sealing element is non-rotatably connected with said outer race and is axially stressed to bear against said inner race.

22. The apparatus of claim 1, wherein said bearing means includes a first race and a second race, and further comprising sealing means interposed between at least one of said races and one of said flywheels.

23. The apparatus of claim 22, wherein said races include an inner race and an outer race, said first flywheel comprising an axial protuberance which is surrounded by said inner race and said sealing means being interposed between said inner race and said protuberance.

24. The apparatus of claim 1, wherein one of said flywheels has a sealable opening for admission of fluid medium into said chamber.

25. The apparatus of claim 1, wherein said damper means further includes a substantially rigid flange-like member having a radially inner portion with means for transmitting torque to said second flywheel, said member having first window means for said at least one energy storing element and said first flywheel being provided with second window means for said at least one energy storing element so that the energy storing element can transmit torque from said first flywheel to said member.

26. The apparatus of claim 1, wherein said second sidewall includes a radially outer portion which is carried by said first flywheel and a radially inner portion which seals said chamber.

* * * * *